UNITED STATES PATENT OFFICE.

FRANK S. WASHBURN, OF RYE, NEW YORK, ASSIGNOR TO AMERICAN CYANAMID COMPANY, OF NEW YORK, N. Y., A CORPORATION OF MAINE.

FERTILIZER AND PROCESS OF PRODUCING THE SAME.

1,367,846.  Specification of Letters Patent.  Patented Feb. 8, 1921.

No Drawing.  Application filed March 12, 1920. Serial No. 365,183.

*To all whom it may concern:*

Be it known that I, FRANK S. WASHBURN, a citizen of the United States, residing at Rye, in the county of Westchester and State of New York, have invented certain new and useful Improvements in Fertilizers and Processes of Producing the Same; and I do hereby declare the following to be a full, clear, and exact description of the invention, such as will enable others skilled in the art to which it appertains to make and use the same.

This invention relates to a new fertilizer and process of producing the same, and has for its object to simplify the production and utilization of similar products heretofore proposed.

With this and other objects in view the invention consists in the novel composition of matter, constituting the fertilizer, and the novel steps and combinations of steps constituting the process, all as will be more fully hereinafter disclosed and particularly pointed out in the claims.

In order that the precise invention may be the more clearly understood, it is said:—In my U. S. Patent #1,100,638, dated June 16, 1914, and entitled Fertilizer and process of making the same, I disclosed a process for producing a combination of ammonia and phosphoric acid by first treating phosphate rock with such an excess of sulfuric acid that a crude phosphoric acid mixed with sulfuric acid would result, and I then treated this mixture of phosphoric acid and sulfuric acid with ammonia to produce the desired product. I thereby produce a mixed crystal combination of ammonia with phosphoric and sulfuric acids. The excess of sulfuric acid that is present in the phosphoric acid was limited to such an excess as would react with the iron, aluminum, and calcium carbonate present, and would also produce the mixed crystals under the conditions stated.

Such an excess was found to be from say 5% to 10%, and it was further found this said excess could not be greatly increased, because, such an increase would cause the calcium sulfate formed to be precipitated in such a finely divided condition that it could not be commercially filtered out. This objection limited the patented process commercially to only certain ratios of phosphorus to ammonia in the finished product, all as will appear more fully below.

It was soon found, however, highly desirable to produce various concentrated fertilizers containing other and different percentages of ammonia and phosphoric acid, and some of these percentages are above the limits of composition that are commercially possible with my above mentioned patented process.

These said other concentrated fertilizers have heretofore been produced by mechanically mixing high grade raw materials, such as ammonium sulfate, and double super-phosphate, or ammonium sulfate and acid phosphate. These constituents have been so mixed mechanically as to give in the resulting product any desired ratios of ammonia to phosphorus pentoxid.

For example, if one wanted to produce a product containing equal proportions of ammonia and phosphorus pentoxid from an ammonium sulfate containing say 25% ammonia and a double super-phosphate containing 45% phosphorus pentoxid, he would mix 356 pounds of the double super-phosphate with 644 pounds of ammonium sulfate. This would give him a total charge of 1,000 pounds of product containing roughly 16.1% ammonia and 16.1% phosphorus pentoxid, in the resulting fertilizer product.

It is further evident that by a suitable calculation one could likewise mechanically so mix suitable materials that he could obtain a product containing say one part of ammonia and two parts of phosphorus pentoxid, or other desired ratio of ammonia to phosphorus, such for example, as one part of ammonia to three parts of phosphorus pentoxid, or two parts of ammonia to three parts of phosphorus pentoxid. But, in mixing two such compounds, one is always limited in the final composition of the fertilizer by the concentration of the original materials, and cannot therefore obtain a final product having a concentration beyond said limits. For instance, if one attempts to make a fertilizer mixture containing equal percentages of ammonia and phosphorus pentoxid from ammonium sulfate, and a double super-phosphate, he cannot expect to have more than say 16.5% of either of these constituents.

In my said U. S. Letters Patent #1,100,638, above mentioned, the procedure outlined would give a crude acid containing say 15% to 20% phosphorus pentoxid, and several per cent. of sulfuric acid. And, when this resulting crude acid was neutralized with ammonia it formed a product containing say from 13% to 15% of ammonia and from 45% to 48% of phosphorus pentoxid.

Now, should one increase the amount of sulfuric acid used in making this said crude phosphoric acid to a material percentage beyond that called for in my said patent, or to an amount at which appreciable quantities of ammonium sulfate would be formed on the neutralization of the mixture with ammonia, he would, it is true, be able to obtain fertilizer mixtures wherein the ratio of the ammonia to the phosphorus pentoxid content could be controlled by the amount of the excess of sulfuric acid employed in decomposing the phosphate rock. But, in such case, as above stated, if he adds to the rock for this larger excess, a percentage above say 5% to 10% of sulfuric acid, he will of course produce the desired crude phosphoric acid, but he will also find that the calcium sulfate formed in the reaction is precipitated in such a finely divided state that a filtration step for its subsequent removal becomes practically impossible. It therefore results that the wide range of proportions of ammonia to phosphoric acid to be described below are not commercially possible in said patent.

In carrying out my present invention, on the other hand, I avoid these objections by proceeding as follows:—I make a crude phosphoric acid by treating phosphate rock with sulfuric acid, using an excess of from say 2% to 10% over and above that required to decompose all of the tri-calcium phosphate and to react with the iron, aluminum, carbonates, and other impurities present, and to convert them in most cases to sulfates, just as is described in my said patent. After filtering this gives me a crude phosphoric acid containing approximately say 25% $H_3PO_4$, and with the corresponding excess of sulfuric acid present therein. I next mix this filtered crude phophoric acid with a predetermined amount of 60° Bé. sulfuric acid, and thus provide for the presence of any desired excess of sulfuric acid. By this procedure it will be seen I am enabled to commercially produce a very wide range of proportions of ammonia to phosphoric acid in the product. For example, if I want a final product containing 20% phosphorus pentoxid and 20% ammonia, I employ say 1000 pounds of phosphoric acid containing 25% $H_3PO_4$ and 487 pounds of 60° Bé., sulfuric acid. I find on mixing these acids that the temperature of the mixture rises from 50° to 60° F., above the temperature of the original constituents, and I further find at this higher temperature there is evolved a great deal of the hydrofluoric acid gas that was dissolved in the phosphoric acid.

At this point, of the procedure, this is a decided advantage, inasmuch as it removes an appreciable percentage of the inert material that one would otherwise find in his final product. I next heat the resulting mixed acids almost to the boiling point in order to remove practically all the remaining hydrofluoric acid present. I also find upon mixing these said acids that appreciable quantities of the calcium sulfate that remained in solution in my prior crude phosphoric acid is precipitated, but it gives no trouble in the filters.

This is also an advantage in this process for still more of the inert material can be thus removed from the solution. I next filter this mixture of phosphoric and sulfuric acids to remove the said precipitated calcium sulfate and any other impurities that may have come down, and I then transfer the mixed acids to a suitable container for treating with ammonia. I next pass ammonia gas into the mixture of phosphoric and sulfuric acids thus obtained, until the same is neutral to a methyl orange indicator. It is found that during this neutralization with gaseous ammonia about 40% of the total water in the mixture is evaporated, which is another advantage in this process. The rapid evolution of steam thus produced may carry along with it a small quantity of ammonia, and if so, the latter may be recovered in a suitable scrubbing apparatus.

It is found that the reaction product now contains an amount of ammonium sulfate and its composition is governed by the sulfuric acid present in the acid mixture, and mono-ammonium phosphate formed by the neutralization of the phosphoric acid, a portion of each being present as mixed crystals of mono-ammonium phosphate and sulfate.

In the example cited, I used 1000 pounds of 25% phosphoric acid and 487 pounds of 60° Bé. sulfuric acid, and obtained as a final product a composition containing roughly 20% of ammonia and 20% phosphorus pentoxid.

I have made several thousand tons of this material, thus showing that the process is entirely practical, and have proved that the product is desirable in the fertilizer industry.

Not only may a concentrated fertilizer having a ratio of 20% ammonia to 20% $P_2O_5$ be thus produced, but other ratios of ammonia to phosphoric acid may be readily had as follows:—

A fertilizer containing say 17% ammonia to 34% $P_2O_5$ may be had by mixing with 1000 pounds of the crude phosphoric acid 150 pounds of 60° Bé. sulfuric acid and neutralizing with ammonia in accordance with the above disclosure.

In like manner, a ratio of 18% ammonia to 27% $P_2O_5$ may be attained by adding 1000 pounds of said crude phosphoric acid, 260 pounds of 60° Bé. $H_2SO_4$.

In other words, the composition of the final product is not limited in the same way as is the composition of my patented product, and in this process it is governed by the relative proportions of sulfuric acid and phosphoric acid present. It follows that any desired ratio of $P_2O_5$ to $NH_3$ may be readily had. In fact, said ratio may be less than one, or greater than one, as desired.

Stated in other language, if pure sulfuric acid be neutralized with ammonia one may obtain, in the product, say 25% $NH_3$, and upon neutralizing my crude phosphoric acid that has not been mixed with 60° Bé., $H_2SO_4$ one may, in the product, obtain say 13% $NH_3$ and 47% $P_2O_5$. From this data the desired composition of the new fertilizer can be readily worked out, by taking into account the strengths of the acids and amounts of the impurities present in each case. The excess of $H_2SO_4$ present, upon neutralization can be counted on as forming ammonium sulfate, and as the latter contains a higher percentage of ammonia than does the crude ammonium phosphate it naturally increases the percentage of $NH_3$ and decreases the percentage of $P_2O_5$ in the final product. It results that within a certain range, I am enabled to control the grade of the final product by controlling said excess of 60° Bé., $H_2SO_4$, a result that could not be attained in my patented process due to the precipitation of the calcium sulfate mentioned.

The advantages of my new and improved process are:—

1. I obtain a perfectly mixed material through chemical agencies;
2. My product is much more simple to employ in the fertilizer industry than those heretofore proposed, for I do not employ the separate ingredients heretofore used to make up the final product;
3. I eliminate a difficult mechanical mixing operation, heretofore encountered;
4. I eliminate an unusual amount of chemical control work necessary in carrying out prior processes;
5. I eliminate automatically from 30% to 50% of the water from the mixture by the present process by employing chemical heat, and therefore, do not have to evaporate it as heretofore;
6. I make and handle only one product instead of two, and consequently, need only one set of apparatus to produce the same;
7. I eliminate an appreciable amount of inert material from my final product, and thus purify the same to a material extent.

It is self evident that in this new process I can use phosphoric acid made by treating any phosphate rock with sulfuric acid, or it may be made in any well known manner. Therefore, I do not wish to be limited to the source of the phosphoric acid.

It is obvious that those skilled in the art may vary the details of the process without departing from the spirit of the invention, and therefore, I do not wish to be limited to the above disclosure except as may be required by the claims.

What I claim is:—

1. The process of producing a fertilizer material containing a desired ratio of ammonia to phosphorus pentoxid which consists in mixing phosphatic rock with such an excess of a mineral acid as will produce a crude phosphoric acid capable of being readily filtered; filtering and adding to the crude phosphoric acid thus produced a sufficient quantity of a mineral acid to produce the desired proportion of phosphoric acid in the finished product; and neutralizing the mixture thus produced with ammonia, substantially as described.

2. The process of producing a fertilizer containing a desired ratio of ammonia to phosphorus pentoxid which consists in mixing a filtered crude phosphoric acid derived from phosphate rock with sufficient sulfuric acid to produce said ratio; heating the mixture thus produced to drive off any volatile constituents present; and neutralizing the mixture with ammonia, substantially as described.

3. The process of producing a fertilizer material containing substantially the desired ratio of ammonia to phosphorus pentoxid which consists in providing a crude phosphoric acid derived from the treatment of phosphate rock with sulfuric acid; treating said acid with an additional quantity of sulfuric acid sufficient to produce the desired ratio; removing a portion of the impurities present by heating the mixture; and neutralizing the acid mixture with ammonia, substantially as described.

4. The process of producing a fertilizer material containing a desired ratio of ammonia to phosphorus pentoxid, which consists in treating a crude phosphoric acid derived from phosphate rock with sulfuric acid in a quantity sufficient to produce the desired ratio; heating the mixture to drive off any fluorin compounds present; utilizing the heat generated by the mixing operation to eliminate a portion of the water present; treating said mixed acids with ammonia until substantially all of the phosphoric acid present has been converted to mono-ammonium phosphate and substantially all of the sulfuric acid has been converted to ammonium sulfate thereby removing a substantial portion of the water present; and recovering the product, substantially as described.

5. The process of producing a fertilizer material containing a predetermined ratio of ammonia to phosphorus pentoxid which consists in preparing a crude phosphoric acid by treating phosphate rock with an excess of sulfuric acid not substantially exceeding 10%; removing the insoluble material from the said crude phosphoric acid thus produced; mixing said crude phosphoric acid with an additional amount of sulfuric acid; and treating said acid mixture thus produced with ammonia until neutral; and recovering the product, substantially as described.

6. The process of producing a fertilizing material containing a desired ratio of ammonia to phosphorus pentoxid which consists in preparing a crude phosphoric acid containing some sulfuric acid by treating phosphate rock with sulfuric acid in an excess not substantially exceeding 10%; removing the insoluble matter from the freshly prepared phosphoric acid; mixing an additional amount of sulfuric acid with said phosphoric acid; heating said acid mixture to remove volatile constituents; treating said acid mixture with ammonia until substantially all of the phosphoric acid has been converted to mono-ammonium phosphate and substantially all of the sulfuric acid has been converted to ammonium sulfate, thereby removing a substantial portion of the water present; and collecting the product, substantially as described.

7. The process of producing a fertilizing material containing substantially equal parts of ammonia and phosphorus pentoxid which consists in preparing a crude phosphoric acid by treating phosphate rock with sulfuric acid in an excess not substantially exceeding 10%; removing the insoluble matter from the said crude phosphoric acid; mixing a mineral acid with said crude phosphoric acid; heating the acid mixture to remove the volatile constituents; removing any insoluble matter present from said acid mixture; and treating the mixture with ammonia until chemically neutral; substantially as described.

8. The process of producing a fertilizer material containing substantially one part of ammonia to a desired number of parts of phosphorus pentoxid which consists in preparing a crude phosphoric acid by treating phosphate rock with sulfuric acid in an excess not substantially exceeding 10%; removing the insoluble matter from said crude phosphoric acid solution; mixing said phosphoric acid solution with a sufficient amount of sulfuric acid to produce the desired ratio of ammonia to phosphorus in the finished product; heating said acid mixture to remove the volatile constituents; removing the insoluble matter from said acid mixture; treating said acid mixture with ammonia until substantially all of the sulfuric acid present has been converted to ammonium sulfate and substantially all of the phosphoric acid has been converted to mono-ammonium phosphate thereby removing substantially all of the water present; and collecting the product, substantially as described.

9. The process of producing a fertilizer material containing substantially two parts of ammonia to three parts of phosphorus pentoxid which consists in treating phosphate rock with sulfuric acid in an excess not substantially exceeding 10% to produce a crude phosphoric acid solution; removing the insoluble matter from said crude acid solution; mixing substantially 1,000 pounds of said crude solution with substantially 260 pounds of 60° Bé. sulfuric acid; removing the volatile and insoluble constituents from said acid mixture; and treating said acid mixture with ammonia until substantially neutral, thereby removing substantially all of the water and collecting the product for the purpose substantially as described.

10. The herein described new fertilizer material consisting of a mixture of ammonium sulfate, mono-ammonium phosphate and a mixed crystal combination of ammonia with sulfuric and phosphoric acids, the total mixture containing a ratio of phosphorus pentoxid to ammonia, less than $2\frac{1}{2}$, substantially as described.

11. The herein described new fertilizer material consisting of a mixture of ammonium sulfate, mono-ammonium phosphate and a mixed crystal combination of ammonia with sulfuric and phosphoric acids, the total mixture containing a ratio of phosphorus pentoxid to ammonia substantially as three to two, substantially as described.

In testimony whereof I affix my signature.

FRANK S. WASHBURN.